United States Patent [19]

Shiraishi

[11] Patent Number: 5,029,010
[45] Date of Patent: Jul. 2, 1991

[54] IMAGING SYSTEM WITH OPTICAL LOW-PASS FILTER

[75] Inventor: Akihiko Shiraishi, Kawasaki, Japan
[73] Assignee: Canon Kabushiki Kaisha, Japan
[21] Appl. No.: 442,001
[22] Filed: Nov. 28, 1989
[30] Foreign Application Priority Data Nov. 28, 1988 [JP] Japan ................. 63-300197

[51] Int. Cl.$^5$ .............. G02B 13/16; G02B 15/00; H04N 5/225; H04N 5/232
[52] U.S. Cl. .................. 358/225; 358/227; 350/423; 350/439
[58] Field of Search ........... 358/225, 227; 350/423, 350/439, 451, 479, 247, 162.12, 162.15; 354/79, 286

[56] References Cited

U.S. PATENT DOCUMENTS

| | | |
|---|---|---|
| 3,784,734 | 1/1974 | Watanabe et al. |
| 3,821,795 | 6/1974 | Okano |
| 3,848,969 | 11/1974 | Tajima |
| 4,588,266 | 5/1986 | Komoto .................. 350/439 |
| 4,638,353 | 1/1987 | Nagasaki et al. .......... 358/42 |
| 4,702,567 | 10/1987 | Kato et al. ............... 350/423 |
| 4,805,028 | 2/1989 | Nishioka et al. .......... 358/225 |
| 4,840,468 | 6/1989 | Tanaka .................... 350/423 |

FOREIGN PATENT DOCUMENTS 45-29614 9/1970 Japan .

Primary Examiner—James J. Groody
Assistant Examiner—Wendy R. Greening
Attorney, Agent, or Firm—Fitzpatrick, Cella, Harper & Scinto

[57] ABSTRACT

A lens incorporates a plurality of lens units including at least one movable lens unit which is movable to change one of the functions of the lens. The lens has an optical low-pass filter on the side of the movable lens unit which is closer to an object. The optical low-pass filter separates a light incident upon it into at least two rays of light and emits the rays in at least in two different directions. The lens is characterized in that, when a coefficient l is given by:

$$l = S + G - SG/F$$

where F is the focal length of the lens unit disposed on the side of the optical low-pass filter closer to an image forming surface, G is the distance between the front principal plane of the lens unit and the optical low-pass filter, S is the distance between the rear principal plane of the lens unit and the image forming surface, the lens unit satisfies $$l_{MIN}/l_{MAX} > 0.7$$

where $l_{MAX}$ is the absolute maximum value of l obtained in the overall movable states available in the lens, and $l_{MIN}$ is the minimum absolute value of the same coefficient.

21 Claims, No Drawings

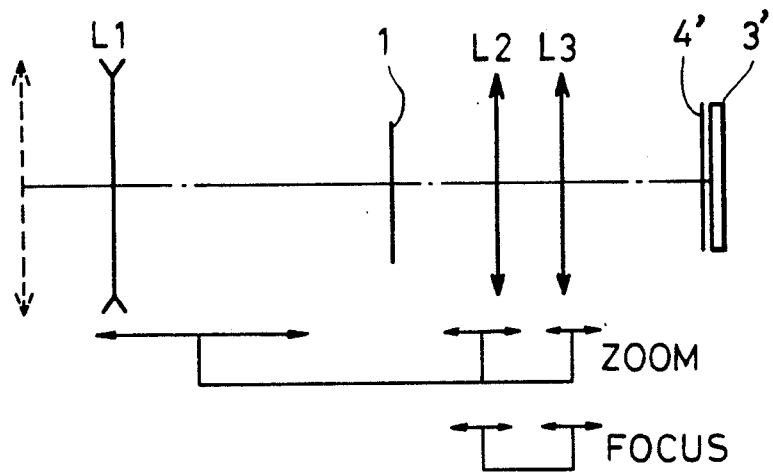

IMAGING SYSTEM WITH OPTICAL LOW-PASS FILTER

BACKGROUND OF THE INVENTION

1. Field of the Invention

The present invention relates to a lens with an optical low-pass filter incorporated therein and it also relates to a still-picture type camera or a moving-picture type video camera with such lens.

The lens according to the present invention enables the optical low-pass filter to be disposed near a lens unit that is moved along the optical axis of the lens unit. The movement of the lens unit, which is disposed between an object and the low-pass filter, enables the objective distance or the focal length of the lens to be varied, which in turn expands the potential of the design of the lens.

2. Description of the Related Art

Lens for use in a video camera or the like employs an image pickup element, such as a CCD (charge coupled device), capable of reproducing an image by discretely sampling image information received from an object. However, when the information from the object contains components with spatial frequencies exceeding the critical frequency of the image pickup element, moire fringes which do not originally belong to the object appear on the screen. Alternatively, thick stripes of local maxima and minima of density appear in a thin stripe pattern, that is, a so-called "beat disturbance" occurs.

More specifically, the frequency components of the object information which cannot be picked up by a camera cannot be reproduced as image information and this causes what is called wave-form distortion (aliasing).

In a conventional lens for use in, for example, a video camera, this aliasing is restricted by providing an optical low-pass filter in the optical path of the lens. The rays of light coming from the object pass through this optical low-pass filter, whereby they are directed into a plurality of directions. This results in the formation of the image of one spot on the image forming surface as a plurality of spots.

The high frequency characteristics of the object are thus limited so as to limit the effects of the aliasing.

Various types of optical low-pass filters are known. Examples include one which utilizes the double refraction caused by a uniaxial crystal such as rock crystal, and one which utilizes the diffraction effects of a diffraction grating disposed in the optical path of the lens.

The diffraction grating employed in a low-pass filter has a cyclic pattern that is either a, a sine curve or a trapezoidal pattern. A diffraction grating having a trapezoidal pattern is disclosed in the specifications of, for example, U.S. Pat. Nos. 3,821,795 and 3,784,734 and Japanese Patent No. sho 45-29614.

In particular, an optical low-pass filter of the type which employs a diffraction grating can be readily manufactured by molding a plastic, and such filter is therefore inexpensive. Accordingly, such filters have been widely used in lenses in recent years.

An optical low-pass filter employing a diffraction grating ensures desired low-pass effects no matter where it is disposed within the optical path of the lens. However, it is desirable to incorporate it into the lens to project it from dust and damage to the lens surface. In addition, incorporating the low-pass filter into the lens reduces the overall size of the lens unit.

However, incorporation of a diffraction grating in the lens can cause the following problems, such as those described below in detail with reference to FIG. 3.

FIG. 3 illustrates the optical function of part of an optical system in which an optical low-pass filter employing a diffraction grating is incorporated in a lens.

In FIG. 3, an optical low-pass filter 1 employing a diffraction grating is capable of separating a beam incident upon it into two bundles of rays 4a and 4b which project in different directions which form an included angle of, for example, $\theta$. A movable rear lens unit 2 having a positive refracting power includes at least one movable lens element. The rear lens unit 2 is disposed on the side of the optical low-pass filter 1 closer to an image forming surface 3. The rear lens unit 2 may include another movable lens element or a fixed lens element. A solid state imaging device with a color filter is displaced on the image forming surface 3. The rear lens unit 2 receives the rays of light from the optical low-pass filter, and produces an image 1A.

Rays of light coming from an object pass through a lens unit disposed near the object (not shown) and reach the optical low-pass filter 1. The light incident upon the low-pass filter 1 emerges from the filter as diffracted light having the intensities shown in FIG. 4 due to the spatial frequency characteristics of the optical low-pass filter 1. The two diffracted bundles of rays 4a and 4b having different orders of diffraction emerge from the optical low-pass filter in two separate directions which form an included angle $\theta$. The rays then pass through the rear lens unit 2 disposed on the side of the filter closer to the image forming surface, and form two spot images 5a and 5b on the image forming surface 3.

The individual spot images 5a and 5b are equivalent to those formed when the optical low-pass filter 1 having a separation angle of $\theta$ is disposed at the position of an image 1A formed by the rear lens unit 2 using the rays of light which pass through the optical low-pass filter 1. From this fact, it is apparent that the distance D between the two spot images 5a and 5b formed on the image forming surface 3 is expressed by $$D = |\theta' \, l'| \ldots \qquad (1)$$

where $\theta'$ is an extremely small angle and $l'$ is the distance between image 1A and the image forming surface 3.

Thus, as long as the distance D between the two spot images 5a and 5b formed on the image forming surface 3 is constant, desired low-pass effects can be obtained without varying the spatial frequency characteristics of the optical low-pass filter 1.

However, when the movable lens unit in the rear lens unit 2 is moved, for example, in zooming or focusing, the position and the magnification of the image 1A formed by the rear lens unit 2 using the rays of light from the optical low-pass filter 1 vary, thus varying the position of the spot images 5a and 5b on the image forming surface 3 and, hence, the distance D between them.

This variation in the distance D varies the spatial frequency characteristics of the optical low-pass filter 1, thus prohibiting the desired low-pass effects from being obtained.

This problem may be avoided in the conventional video camera or the like by disposing the optical low-pass filter on the side of a fixed focal length lens closer to the object or immediately in front of a final lens unit of an optical system which consists of a fixed lens unit. This, however, limits the optical design of the optical system.

SUMMARY OF THE INVENTION

An object of the present invention is to provide a lens with an optical low-pass filter incorporated therein which enables a lens unit, which is disposed on the image side of the low-pass filter, to be moved to change at least one optical function of the lens.

Another object of the present invention is to provide a lens for use in a video camera with a solid state image detecting device, which has a focusing or zooming or focusing/zooming lens unit in the vicinity of an image forming surface of the lens.

Another object of the present invention is to provide a video camera with the aforementioned photographic lens.

In accordance with one aspect of the invention, an objective lens having an optical axis and an image forming surface for reproducing image information of an object, comprises;

a first movable lens unit movable along the optical axis;

an optical low-pass filter disposed on the object side of the movable lens unit, the low-pass filter directing rays of light incident thereon into a plurality of directions; and a rear lens unit including the first movable lens unit, and having a front principal plane and a rear principal plane, the rear lens unit being disposed between the optical low-pass filter and an image forming surface of the rear lens unit;

wherein, when a coefficient l is given by:

$$l = S + G - \frac{S \cdot G}{F}$$

where F is the focal length of the rear lens unit, G is the distance between the front principal plane of the rear lens unit and the optical low-pass filter, S is the distance between the rear principal plane of the rear lens unit and the image forming surface, the lens part satisfies the following condition;

$$l_{MIN}/l_{MAX} > 0.7$$

where $l_{MAX}$ is the maximum absolute value of l when the movable lens unit is moved along the optical axis and $l_{MIN}$ is the minimum absolute value of l.

In accordance with another aspect of the invention, a camera, comprises:

an image pick up element for outputting a video signal;

an objective lens for forming an image of an object on the pick up element, the lens having an optical axis and including a first movable lens unit movable along the optical axis to change a function of the objective lens, and a second lens unit; and an optical low-pass filter disposed on the object side of the first movable lens unit and movable in synchronism with the movable lens unit, the optical low-pass filter being constructed and arranged to form object images on the image pick up element which are shifted from each other.

DETAILED DESCRIPTION OF THE PREFERRED EMBODIMENTS

A first embodiment of the present invention will be described below with reference to FIG. 1, which shows the paraxial refractive power arrangement of a Thin Lens system in which an optical low-pass filter is disposed within a wide angle type zoom lens system consisting of two lens units, which is disclosed in the specification of, for example, U.S. Pat. No. 3,848,969.

Figure 1:
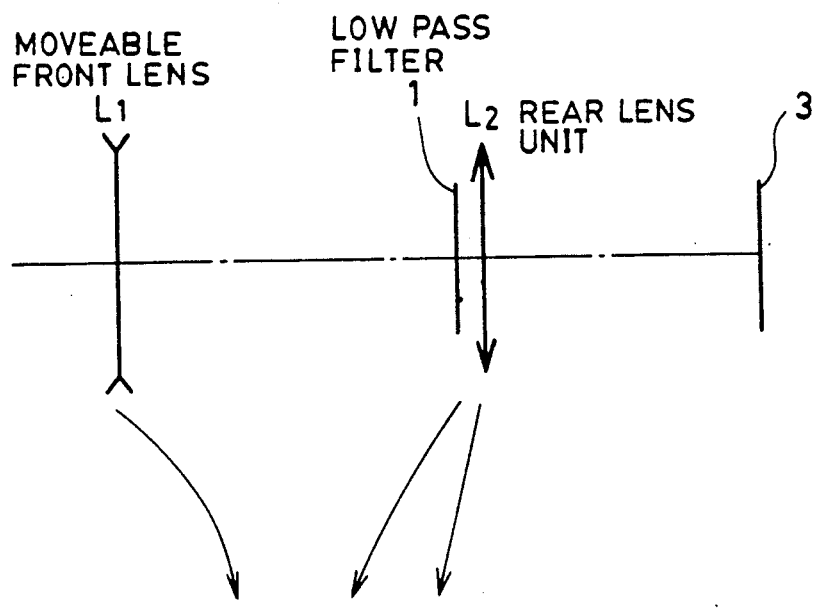
FIG. 1 is an optical diagram which the paraxial refractive power arrangement obtained when an optical low-pass filter is disposed within a two-unit zoom lens, according to a first embodiment of the present invention.
Figure 5:
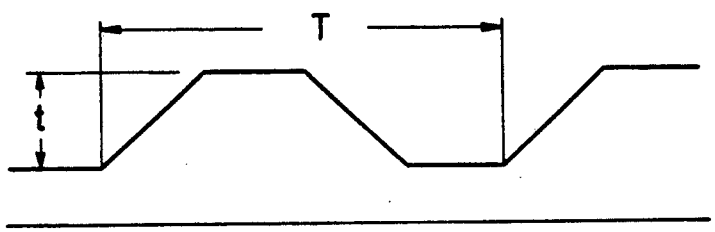
FIG. 5 is a partial cross-section of an optical low-pass filter which may be used in the invention.

This lens system of FIG. 1 includes a movable front lens unit L1 having a negative refractive power, an optical low-pass filter 1 which is a diffraction grating for separating a light incident thereon into at least two light beams which form a constant angle, and a movable rear lens unit L2 having a positive refractive power. The rear lens unit L2 includes at least one movable lens, and is disposed on the side of the optical low-pass filter 1 which is closer to an image forming surface 3. A diffraction grating type low-pass filter such as disclosed in the U.S. patent application Ser. No. 379,221 filed on July 13, 1989 by the present assignor may be used as the low-pass filter 1. FIG. 5 shows the cross-section of that low-pass filter. In FIG. 5, T is of the order of a few hundreds μm, and t is of the order of 0.5 to 1.5 μm.

In this embodiment, when the focal length and hence magnification are to be varied, the front and rear lens units L1 and L2 are moved in the directions indicated by the arrows in FIG. 1, and the optical low-pass filter 1 is moved together with the lens units toward an object. Each of the lens units usually consists of a plurality of lenses.

In this way, a picture of an object can be taken by a camera without the spatial frequency characteristics of the optical low-pass filter 1 being changed due to zooming or focusing.

More specifically, in the present embodiment, in order to avoid the variations in the characteristics of the optical low-pass filter, the value D shown in Equation (1) is maintained constant by moving the optical low-pass filter when the movable lens of the rear lens L2 unit is moved.

Next, the optical arrangement of the first embodiment will be described below with reference to FIG. 3.

Where F is the focal length of the rear lens unit 2, G is the distance between the front principal plane of the rear lens unit 2 and the optical low-pass filter 1, S is the distance between the rear principal plane of the rear lens unit 2 and the image forming surface 3, a distance l' between the image 1A formed by the rear lens unit 2 using the light which passes through the optical low-pass filter and the image forming surface 3 is expressed by $$l' = S - G' = S - \frac{GF}{G - F} \quad (2)$$

In this embodiment, the optical system comprises a Thin Lens system, so the front and rear principal planes coincide with the position of the rear lens unit 2. The magnification $\beta$ of the rear lens unit 2 is expressed by $$\beta = \frac{F}{F - G} \quad (3)$$

In consequence, the separation angle $\theta$ of the optical low-pass filter 1 and the separation angle $\theta'$ of the image 1A formed by the rear lens unit 2 using the light which passes through the optical low-pass filter 1 has the following relationship:

$$\theta' = \frac{\theta}{\beta} = \frac{F - G}{F} \theta \quad (4)$$

From Equations (1), (2) and (4), we have:

$$D = \left| \left( S + G - \frac{SG}{F} \right) \theta \right| \quad (5)$$

Since a coefficient l is given by $$l = S + G - \frac{SG}{F} \quad (6)$$

we obtain $$D = |\theta l| \ldots \quad (7)$$

Figure 3:
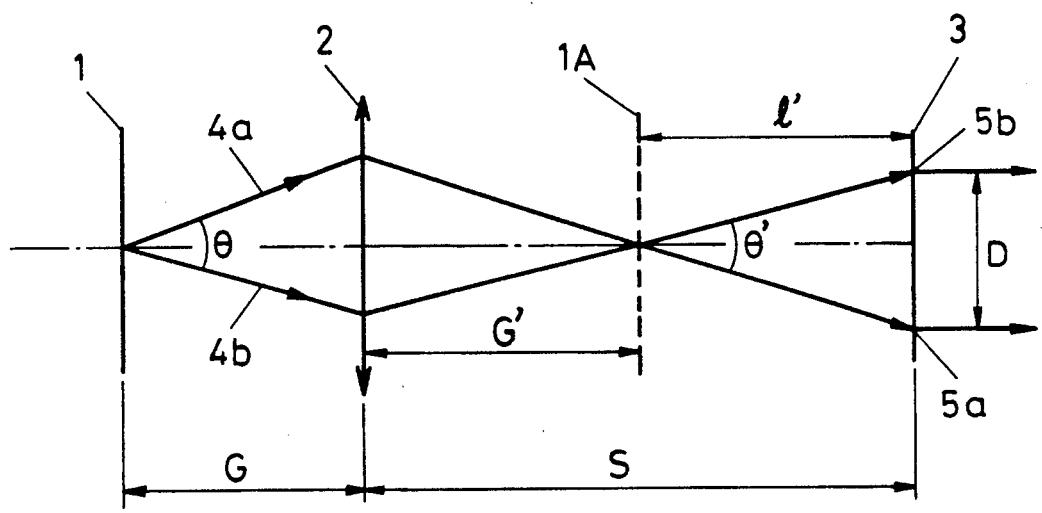
FIG. 3 is an optical diagram which illustrates the optical function of part of an optical system in which an optical low-pass filter employing a diffraction grating is disposed within a lens.

That is, the optical low-pass filter 1 behaves in the optical system shown in FIG. 3 as if it was located at a position apart from the image forming surface 3 by the distance l expressed by Equation (6). This distance l is hereinafter referred to as an optically converted distance.

It is therefore apparent from Equation (7) that the spatial frequency characteristics of the optical low-pass filter 1 can be maintained constant by maintaining the distance l constant.

Accordingly, in the present invention, when the maximum absolute value of the optically converted distances l which are available when the movable lens unit in the rear lens unit is moved to any point to change the focal length and hence magnification during zooming or focusing is $l_{MAX}$, and the minimum absolute value of the optically converted distance l obtained is $l_{MIN}$, the lens satisfies the following condition:

$$l_{MIN}/l_{MAX} > 0.7 \ldots \quad (8)$$

Figure 4:
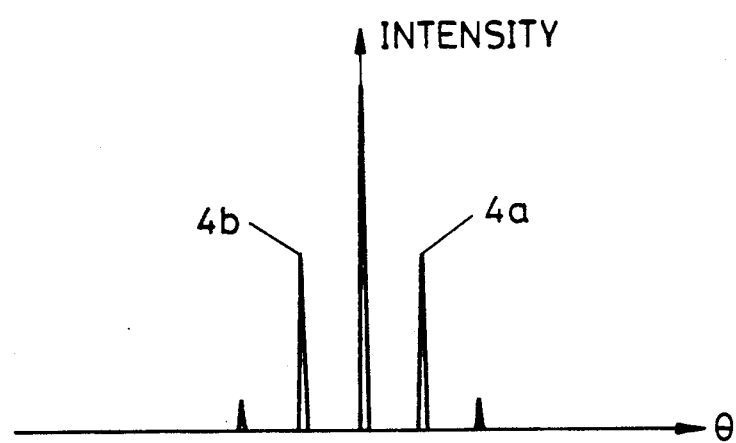
FIG. 4 is a graph showing the intensity of the bundles of rays separated by an optical low-pass filter employing the diffraction grating shown in FIG. 3.

Variations in the expansion of the spot images formed using the optical low-pass filter shown in FIG. 4 can be limited to 30% or less by adequately setting the values of the individual elements such that they satisfy Conditional Expression (8).

Table 1 lists the values of the individual elements in the paraxial refractive power arrangement when the lens units are disposed at the wide-angle end, the intermediate position and the telephoto end, respectively.

(TABLE - 1)

| Focal Length | Wide-Angle End $f_W = 8.26$ | Intermediate Position $f_M = 10.57$ | Telephoto End $f_T = 15.52$ |
|---|---|---|---|
| Front Lens Unit L1 $f_1 = -19.64$ | $e1_W = 23.17$ | $e1_M = 13.81$ | $e1_T = 3.14$ |
| Optical Low-Pass Filter 1 | $e2_W = 1.34$ | $e2_M = 3.90$ | $e2_T = 6.83$ |
| Rear Lens Unit L2 $f_2 = 13.07$ | | | |
| Optically Converted Distance l | $l_W = 18.00$ | $l_M = 18.00$ | $l_T = 18.00$ |

In Table 1,
f1: The focal length of the front, negative lens unit L1;
f2: The focal length of the rear, positive lens unit L2;
e1: The distance between the front, negative lens unit L1 and the optical low-pass filter 1; and
e2: The distance between the optical low-pass filter 1 and the rear, positive lens unit L2
Subscripts: W, M and T respectively indicate that the individual lens units L1 and L2 are at the wide-angle end, the intermediate position and the telephoto end, respectively.

In this embodiment, as is clear from Table 1, the optically converted distances l obtained when the individual lens units L1 and L2 are moved to the wide-angle end, the intermediate position and the telephoto end, respectively, are all 18.00. This gives $$l_{MIN}/l_{MAX} = l_W/l_T = 1;$$

and Conditional Expression (8) is therefore satisfied.

Next, a second embodiment of the present invention will be described with reference to FIG. 2 which shows the paraxial refractive power arrangement when the optical low-pass filter is disposed within the two-unit type zoom lens.

Figure 2:
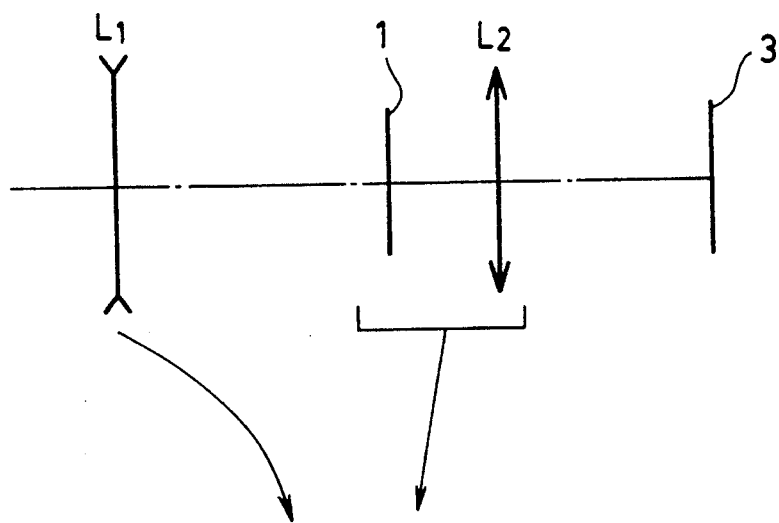
FIG. 2 is an optical diagram which illustrates the paraxial refractive power arrangement obtained when the optical low-pass filter is disposed within the two-unit zoom lens, according to a second embodiment of the present invention.

In FIG. 2, the same reference numerals are used to denote the parts which are the same as those shown in FIG. 1.

In this embodiment, the optical low-pass filter 1 is disposed in front of the rear, positive lens unit L2. When the magnification is to be changed, the optical low-pass filter 1 and the rear, positive lens unit L2 are moved together as one unit toward the object. In this way, the spatial frequency characteristics of the optical low-pass filter 1 can be maintained the same.

Table 2 lists the values of the individual elements in the paraxial refractive power arrangement when the individual lens units are respectively moved to the wide-angle end, the intermediate position and the telephoto end.

Description of the symbols appended to the individual elements is the same as that made with reference to Table 1.

(TABLE - 2)

| Focal Length | Wide-Angle End $f_W = 6.18$ | Intermediate Position $f_M = 7.91$ | Telephoto End $f_T = 11.64$ |
|---|---|---|---|
| Front Lens Unit L1 $f_1 = -19.64$ | $el_W = 18.35$ | $el_M = 10.78$ | $el_T = 2.12$ |
| Optical Low-Pass Filter 1 | $e2_W = 7.50$ | $e2_M = 7.50$ | $e2_T = 7.50$ |
| Rear Lens Unit L2 $f_2 = 10.99$ | | | |
| Optically Converted Distance l | $l_W = 11.95$ | $l_M = 12.25$ | $l_T = 12.89$ |

In this embodiment, as is clear from Table 2, when the individual lens units L1 and L2 are respectively moved to the wide-angle end, the intermediate position and the telephoto end, the optically converted distances l are 11.95, 12.25 and 12.89, respectively. This gives $$l_{MIN}/l_{MAX} = l_W/l_t = 0.927 \quad (9)$$

and Conditional Expression (8) is therefore satisfied.

In this embodiment, the optically converted distances l which are available when the movable lens unit in the rear lens unit L2 is moved to all the movable points during the zooming or focusing are set such that they satisfy Conditional Expression (9). In this way, even when the rear lens unit L2, which is located on the side of the optical low-pass filter which is closer to the image forming surface, includes the movable lens unit, the spatial frequency characteristics of the optical low-pass filter are not changed by the movement of the lens.

The above-described embodiments employ optical low-pass filters of the type which employ a diffraction grating. However, any optical member capable of separating the light incident thereon at a predetermined angle may be employed, including one which employs a Wollaston prism.

Figure 6:
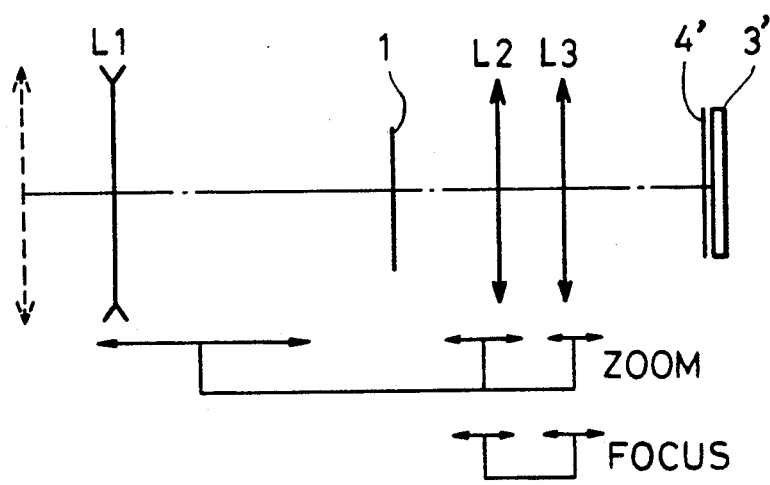
FIG. 6 is an optical diagram similar to FIG. 1, for a third embodiment of the present invention.

In the above-described embodiments, the optically converted distance l is maintained constant by moving the optical low-pass filter as the movable lens unit is moved to change magnification. However, if the rear lens unit (located on the side of the optical low-pass filter which is closer to the image forming surface) includes a plurality of movable lens units L2 and L3, as shown in FIG. 6, the optically converted distance l may be maintained constant without moving the optical low-pass filter.

At that time, the lens is constructed such that it satisfies the formula:

$$S+G+H=\text{Constant} \ldots (10)$$

where S is the distance between the rear principal plane of the rear lens unit 2 and the image forming surface 3, G is the distance between the front principal plane of the rear lens unit 2 and the optical low-pass filter 1, and H is the distance between the front and rear principal points of the rear lens unit. In FIG. 6, reference numerals 3' and 4' respectively denote a video imaging element such as CCD and a color mosaic filter consisting of R, G and B (red, green and blue) elements.

As will be understood from the foregoing description, according to the present invention, even when the rear lens unit located on the side of the optical low-pass filter closer to the image forming surface includes a movable lens unit, the spatial frequency characteristics of the optical low-pass filter can be maintained the same during the change of the magnification by adequately setting the optically converted distances l which are available when the movable lens unit is moved to the individual movable points such that they satisfy the aforementioned Conditional Expression (8). This results in the provision of a compact lens with the optical low-pass filter.

Furthermore, the present invention can be applied to a multi-unit zoom lens or a rear focus lens, and this ensures that the resulting lens with the optical low-pass filter is compact and exhibits the excellent low-pass effects.

What is claimed is:

1. An objective lens having an optical axis and an image forming surface for reproducing image information of an object, comprising;

a first movable lens unit movable along the optical axis;

an optical low-pass filter disposed on the object side of said movable lens unit, said low-pass filter directing rays of light incident thereon into a plurality of directions; and a rear lens unit including said first movable lens unit, and having a front principal plane and a rear principal plane, said rear lens unit being disposed between said optical low-pass filter and an image forming surface of the rear lens unit;

wherein, when a coefficient l is given by:

$$l = S + G - \frac{S \cdot G}{F}$$

where F is the focal length of said rear lens unit, G is the distance between the principal plane of said rear lens unit and said optical low-pass filter, S is the distance between the principal plane of said rear lens unit and the image forming surface, said lens part satisfies the following condition;

$$l_{MIN}/l_{MAX} > 0.7$$

where $l_{MAX}$ is the maximum absolute value of l when said movable lens unit is moved along the optical axis and $l_{MIN}$ is the minimum absolute value of l.

2. An objective lens according to claim 1, further including a front lens unit disposed on the object side of said optical low-pass filter.

3. An objective lens according to claim 1, wherein said first movable lens unit and said optical low-pass filter are arranged to be moved simultaneously.

4. An objective lens according to claim 3, wherein said first movable lens unit and said optical low-pass filter are arranged to be moved in a differential relationship with each other.

5. An objective lens according to claim 3, wherein said first movable lens unit and said optical low-pass filter are arranged to be moved together as one unit.

6. An objective lens according to claim 3, wherein said first movable lens unit is arranged to be moved for zooming.

7. An objective lens according to claim 3, wherein said first movable lens unit is arranged to be moved for focusing.

8. An objective lens according to claim 1, wherein said optical low-pass filter is fixed, and said rear lens part includes a second movable lens unit which is movable in a differential relationship with said first movable lens unit for minimizing variation in a distance D between the rays of light which pass through said optical low-pass filter and are incident on the image forming surface.

9. An objective lens according to claim 1, wherein said optical low-pass filter is a diffraction grating.

10. An objective according to claim 1, wherein said rear lens part is comprised of said first movable lens unit.

11. A camera, comprising:
an image pick up element for outputting a video signal;
an objective lens for forming an image of an object on said pick up element, said lens having an optical axis and including a first movable lens unit movable along the optical axis to change a function of said objective lens, and a second lens unit; and
an optical low-pass filter disposed on the object side of said first movable lens unit and movable in synchronism with said movable lens unit, said optical low-pass filter being constructed and arranged to form object images on said image pick up element which are shifted from each other.

12. A camera according to claim 11, further including a color filter disposed in front of said image pick up element.

13. A camera according to claim 12, wherein said color filter is a color mosaic filter.

14. A camera, comprising:
an image pick up element for outputting a video signal;
a fixed optical low-pass filter for directing a bundle of rays incident thereon in a plurality of directions; and
an objective lens for forming an image of an object on said image pick up element, said lens having an optical axis and including a movable lens unit disposed on the image side of said optical low-pass filter and being movable along the optical axis so as to change a function of said objective lens, and a compensating lens unit disposed on the image side of said optical low-pass filter and being movable either in synchronism with said movable lens unit and in a differential relation therewith so as to minimize the variation in a distance D between the bundle of rays directed by said optical low-pass filter.

15. A camera according to claim 14, further including a color filter disposed in front of said image pick up element.

16. A photographic lens, comprising:
a lens assembly for forming an image of an object, said lens assembly including a first movable lens unit for changing a function of said lens assembly, and a second lens unit; and
an optical low-pass filter disposed on the object side of said movable lens unit and movable in synchronism with said movable lens unit, said optical low-pass filter directing a bundle of rays incident thereon into a plurality of directions.

17. A photographic lens, comprising:
a fixed optical low-pass filter for directing a bundle of rays incident thereon into a plurality of directions; and
a lens assembly for forming an image of an object on an image forming surface, said lens assembly having a plurality of lens units on the image forming surface side of said optical low-pass filter, said plurality of lens units being movable in a differential relation with each other for changing a function of said lens assembly and for minimizing the variance in a distance D between the bundle of rays directed by said optical low-pass filter.

18. A camera comprising:
an image pick up element for outputting a video signal;
a fixed optical low-pass filter for directing a bundle of rays incident thereon in a plurality of directions; and
an objective lens for forming an image of an object on said image pick up element, said lens having an optical axis and including a movable lens unit disposed on the image side of said optical low-pass filter and being movable along the optical axis so as to change a function of said objective lens, and a compensating lens unit disposed on the image side of said optical low-pass filter and being movable either in synchronism with said movable lens unit and in a differential relation therewith so as to minimize the variation in a distance D between the bundle of rays directed by said optical low-pass filter; and
said movable lens unit comprising a first movable lens unit, and having a front principal plane and a rear principal plane, said movable lens unit being disposed between said optical low-pass filter and an image forming surface of the movable lens unit;
wherein, when a coefficient l is given by:

$$l = S + G - \frac{S \cdot G}{F}$$

where F is the focal length of said movable lens unit, G is the distance between the principal plane of said movable lens unit and said optical low-pass filter, S is the distance between the principal plane of said movable lens unit and the image forming surface, and said lens part satisfies the following condition;

$$l\ \text{MIN}\ /\ l\ \text{MAX} > 0.7$$

where l MAX is the maximum absolute value of l when said movable lens unit is moved along the optical axis and l MIN is the minimum absolute value of l;
wherein said optical low-pass filter is disposed on the object side of said movable lens unit and movable in synchronism with said movable lens unit, said optical low-pass filter directing a bundle of rays incident thereon into a plurality of directions.

19. A photographic lens, comprising:
a fixed optical low-pass filter for directing a bundle of rays incident thereon into a plurality of directions; and
a lens assembly for forming an image of an object on an image forming surface, said lens assembly having a plurality of lens units on the image forming surface side of said optical low-pass filter, said plurality of lens units being movable in a differential relation with each other for changing a function of said lens assembly and for minimizing the variance in a distance D between the bundle of rays directed by said optical low-pass filter; and said plurality of lens units having an optical axis and including a movable lens unit disposed on the image side of said optical low-pass filter and being movable along the optical axis so as to change a function of said lens assembly, and a compensating lens unit disposed on the image side of said optical low-pass filter and being movable either in synchronism with said movable lens unit and in a differential relation therewith so as to minimize the variation in a distance D between the bundle or rays directed by said optical low-pass filter;

wherein said plurality of lens units comprises a first movable lens unit, and has a front principal plane and a rear principal plane, said plurality of lens units being disposed between said optical low-pass filter and an image forming surface of the plurality of lens units;

wherein, when a coefficient l is given by:

$$l = S + G - \frac{S \cdot G}{F}$$

where F is the focal length of said plurality of lens units, G is the distance between the principal plane of said plurality of lens units and said optical low-pass filter, S is the distance between the principal plane of said plurality of lens units and the image forming surface, and said lens part satisfies the following condition;

$$l\,MIN\,/\,l\,MAX > 0.7$$

where l MAX is the maximum absolute value of l when said plurality of lens units is moved along the optical axis and l MIN is the minimum absolute value of l; and said lens assembly forms an image of an object on an image forming surface, said plurality of lens units are on the image forming surface side of said optical low-pass filter, and said plurality of lens units are movable in a differential relation with each other for changing a function of said lens assembly and for minimizing the variance in a distance D between the bundle of rays directed by said optical low-pass filter.

20. A camera according to claim 14, wherein said optical low-pass filter is a diffraction grating.

21. A photographic lens according to claim 17 wherein said optical low-pass filter is a diffraction grating.

* * * * *

UNITED STATES PATENT AND TRADEMARK OFFICE
CERTIFICATE OF CORRECTION

PATENT NO. : 5,029,010
DATED : July 2, 1991
INVENTOR(S) : AKIHIKO SHIRAISHI

It is certified that error appears in the above-identified patent and that said Letters Patent is hereby corrected as shown below:

Column 1

Line 54, delete "a,".

Line 68, "project" should read --protect--.

Column 3

Line 50, "$1_{MAN}$" should read --$1_{MAX}$--.

Column 9

Line 8, "objective" should read --objective lens--.

Column 10

Line 15, "movable lens until" should read --movable lens unit--.

Column 12

Line 22, "claim 17" should read --claim 17,--.

Signed and Sealed this

Sixteenth Day of February, 1993

Attest:

STEPHEN G. KUNIN

Attesting Officer

Acting Commissioner of Patents and Trademarks